United States Patent Office 3,131,390
Patented Apr. 28, 1964

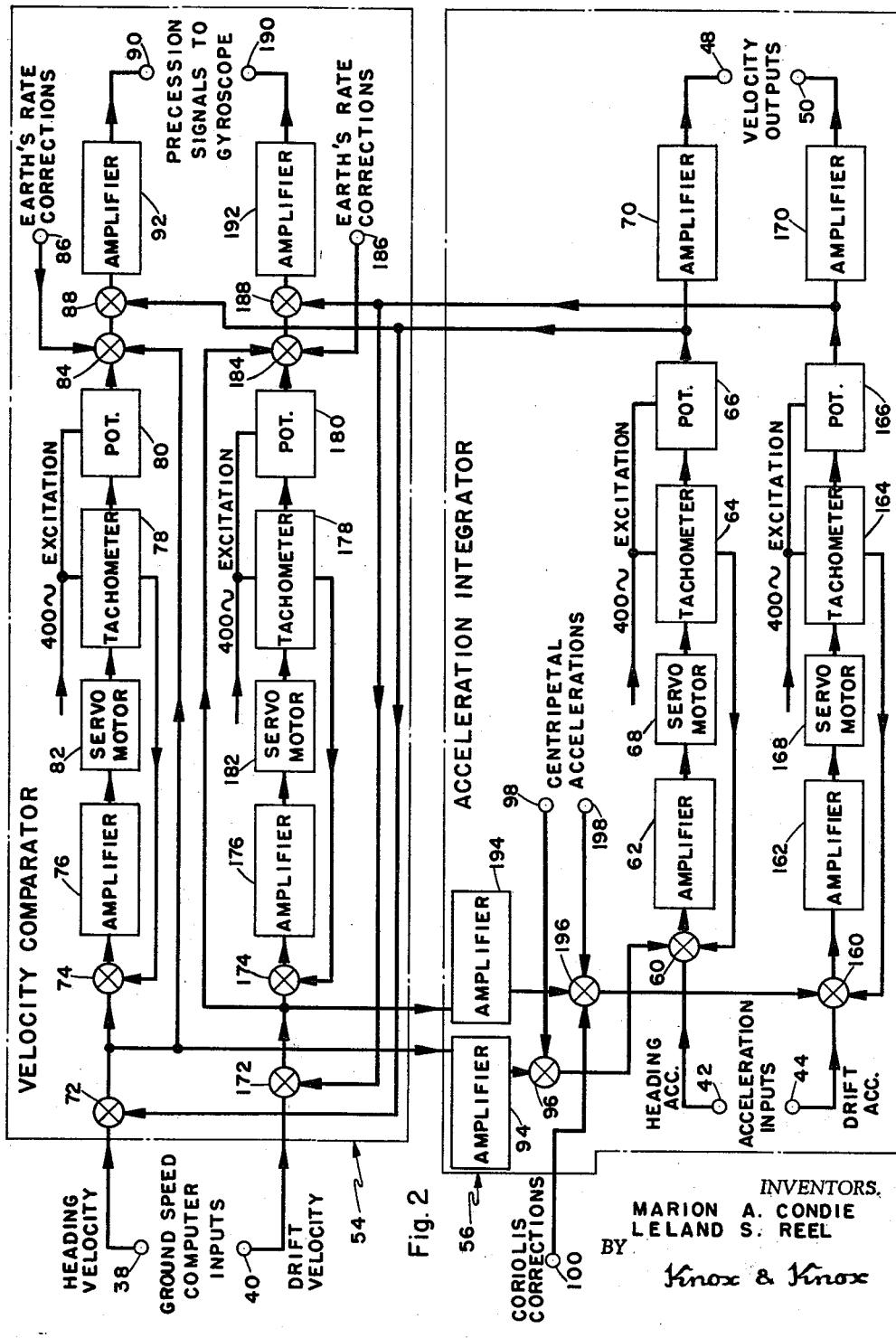

3,131,390
DOPPLER-INERTIAL GROUND VELOCITY INDICATOR
Marion A. Condie, San Carlos, and Leland S. Reel, San Diego, Calif., assignors to Ryan Aeronautical Co., San Diego, Calif.
Filed July 31, 1959, Ser. No. 830,806
9 Claims. (Cl. 343—8)

The present invention relates generally to navigational equipment and more particularly to a Doppler-inertial ground velocity indicator.

The primary object of this invention is to provide a ground velocity indicating system in which Doppler radar is coupled to an inertial system to utilize the long term accuracy of the Doppler radar with the short term accuracy of the inertial system, to achieve high instantaneous accuracy over a long period, yet in which the inertial system contains a stable platform having a single gyroscope with only two axes of freedom.

An other object of this invention is to provide a ground velocity indicating system in which acceleration data obtained from a stable platform is integrated to obtain velocity signals, which are fed to a velocity comparator and compared to Doppler derived velocity components, thus deriving an error signal which is introduced into the system in such a manner as to provide very desirable damping of the oscillation of the inertial system.

Another object of this invention is to provide a ground velocity indicating system in which the velocity feedback in the Doppler-inertial loop provides automatic and constantly corrected precession of the stable platform to obtain a continually accurate vertical reference.

Finally, it is an object to provide a ground velocity indicating system of the aforementioned character which is relatively simple, light in weight and self-contained.

With these and other objects definitely in view, this invention consists in the novel construction, combination and arrangement of elements and portions, as will be hereinafter fully described in the specification particularly pointed out in the claims, and illustrated in the drawings which form a material part of this disclosure, and in which:

FIGURE 2 is a block diagram of the Doppler-inertial interconnector unit.

Similar characters of reference indicate similar or identical elements and portions throughout the specification and throughout the views of the drawings.

Figure 1:
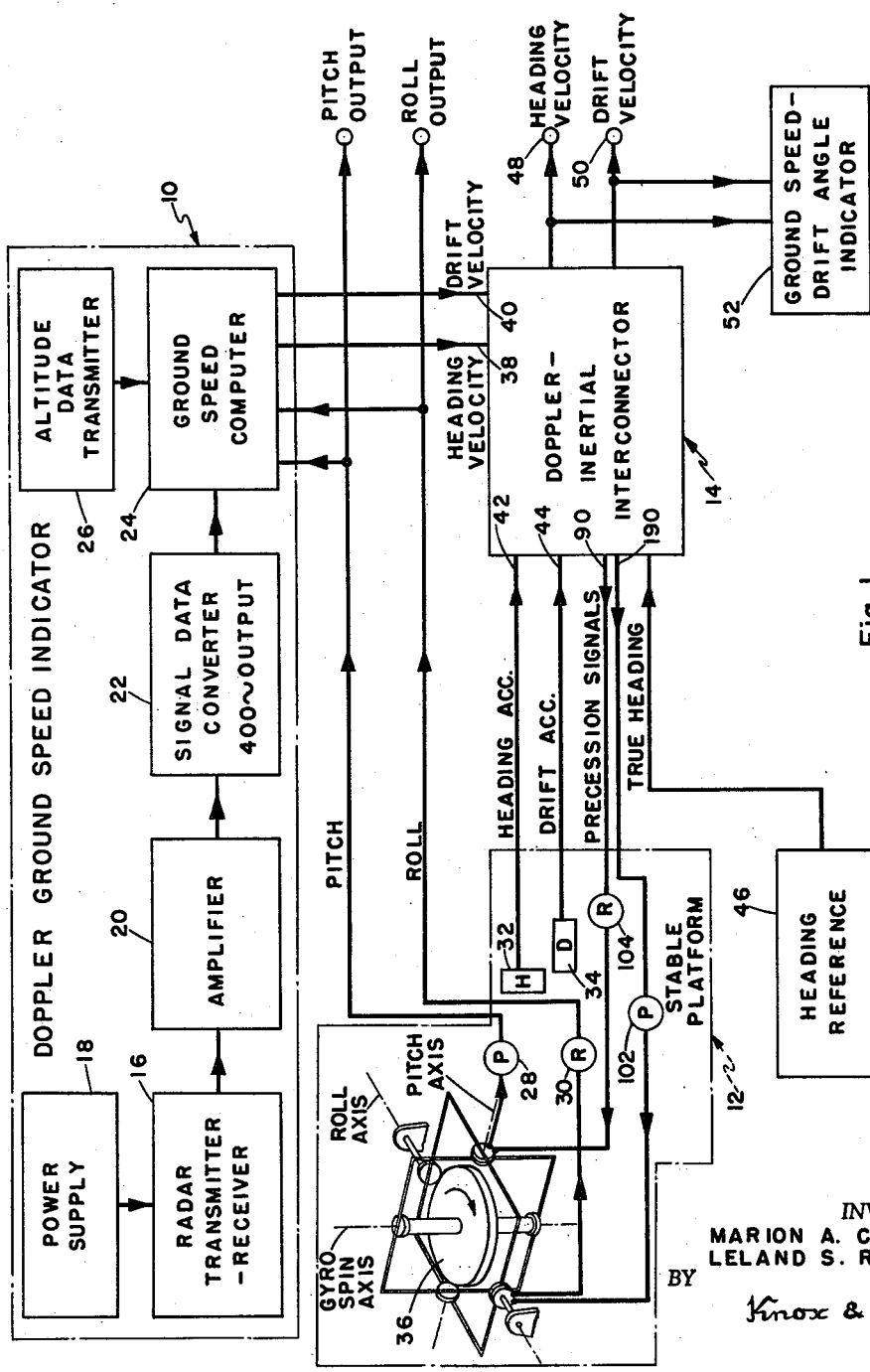
FIGURE 1 is a block diagram of the complete Doppler-inertial system.

The system includes three main components, a Doppler radar unit 10, a stable platform 12 and a Doppler-inertial interconnector 14. The Doppler radar 10 includes a transmitter-receiver 16 operated by a power supply 18 to obtain ground velocity data by measuring Doppler shift in ground directed radar beams, the principle being well known. The signals are fed through an amplifier 20 to a signal data convertor 22 and then to a ground speed computer 24, which is also supplied with altitude information from an altitude data transmitter 26, the velocity signals thus being corrected for altitude rate.

The stable platform 12 contaiins a gyroscope-accelerometer system capable of providing pitch and roll data from gyro pick-offs 28 and 30, and heading and drift acceleration signals from accelerometers 32 and 34, respectively. The single gyroscope 36, as illustrated, has only the two fixed axes of freedom corresponding to the projections of the pitch and roll axes of the aircraft or other vehicle onto the horizontal plane and is sufficient to provide all necessary data to operate the system. Other types of stable platforms may be used, but the complete system herein described requires only the outputs provided by a simple single gyro with two fixed axes of freedom, this being so illustrated as an example. The pitch and roll pick-offs 28 and 30 are connected to the ground speed computer 24 to provide attitude references, the resultant heading velocity and drift velocity signals being fed to the respective inputs 38 and 40 of the interconnector 14. The heading and drift accelerometers 32 and 34 of the stable platform 12 are also connected to the respective inputs 42 and 44 of the interconnector 14. For clarity the gyro pick-offs 28 and 30 and accelerometers 32 and 34 are shown separated from the gyroscope 36, but it should be understood that all these components are normally combined in a self-contained unit. If necessary, a true heading signal may also be supplied to the interconnector 14 from a suitable heading reference source 46, such as a compass or other navigational device. The final heading and drift velocity outputs 48 and 50 of the interconnector 14 are coupled to a suitable ground speed and drift indicator 52 for visual readout.

The Doppler-inertial interconnector 14 comprises two basic units, a velocity comparator 54 and an acceleration integrator 56. In the acceleration integrator 56, the heading acceleration from input 42 is fed into a mixing network 60, the output of which is amplified by an amplifier 62 and used to drive a tachometer 64 and potentiometer 66 through a servo-motor 68. The output of the tachometer 64 is fed back to the mixing network 60 and is compared with the incoming acceleration signal. Thus the angular velocity of the motor 68 is proportional to the acceleration of the aircraft and the output of potentiometer 66 is proportional to the inertially measured velocity of the aircraft, the motor-tachometer-amplifier combination 68–64–62 comprising an integrator to compute the time integral of the acceleration signal. The drift acceleration signal from input 44 is treated in a similar manner through mixing network 160 and amplifier 162, to drive tachometer 164 and potentiometer 166 through a servo-motor 168. The output of tachometer 164 is similarly fed back to the mixing network 160 and compared with the incoming acceleration signal. Provision may be made to set into the potentiometers 66 and 166 the velocity of the aircraft at the time the Doppler-inertial system is activated, thus providing a starting reference. The outputs of potentiometers 66 and 166 are connected, through suitable isolation amplifiers 70 and 170 respectively, to provide velocity outputs 48 and 50.

In the velocity comparator 54, the heading velocity from input 38 is fed through a mixing network 72, which is also connected to the heading velocity output of potentiometer 66. The two velocity signals are compared and the difference output of mixing network 72 is applied to a second mixing network 74, the output of which is amplified by an amplifier 76 and used to drive a tachometer 78 and potentiometer 80 by means of a servo-motor 82. The output of tachometer 78 is fed back to the mixing network 74 for comparison with the velocity difference signal. The output of potentiometer 80 passes through a mixing network 84, to which is added a correction factor for earth's rate from a suitable source 86, the difference output of mixing network 72 also being applied directly to the mixing network 84. The resultant compensated signal is applied to a further mixing network 88, which is also provided with the velocity signal directly from the potentiometer 66, the final output of said mixing network being coupled to a precession signal output 90 through a suitable amplifier 92.

The drift velocity signal from input 40 passes through a similar channel comprising mixing networks 172 and 174, amplifier 176, tachometer 178 and potentiometer 180 driven by servo-motor 182, mixing networks 184, 188, and through amplifier 192 to precession signal output 190. Mixing networks 172 and 188 are connected directly to the output of potentiometer 166 to receive the drift velocity signal therefrom, while mixing network 174 receives the feedback signal from the output of tachometer 178. The mixing network 184 also receives the difference output direct from network 172 and an earth's rate correction from source 186. The precession signals from outputs 90 and 190 are fed to the gyroscope pitch and roll torquers 102 and 104, respectively, of the stable platform 12, to provide the necessary erection signals to maintain the gyro spin axis vertical.

The difference signals from mixing networks 72 and 172 are further fed through amplifiers 94 and 194 to the mixing networks 60 and 160, respectively. Between the amplifiers 94 and 194 and the mixing networks 60 and 160 are additional mixing network 96 and 196 to which the centripetal acceleration corrections are added from inputs 98 and 198. Also, if needed, coriolis corrections from an input 100 may be added to the drift channel through mixing network 196.

The purpose of the velocity comparator 54 is to compare the Doppler derived heading and drift velocities with the inertially derived heading and drift velocities and provide output signals which are proportional to the differences between the signals as well as the time integrals of the differences. The differences are computed by comparison of the signals in the mixing networks 72 and 172, while the time integrals of the differences are derived from the motor-tachometer-amplifier type integrators 82–78–76 and 182–178–176. The difference signals are further added, after suitable scaling in amplifiers 94 and 194, to the mixing networks 60 and 160 which drive the acceleration integrators. The Doppler-inertial interconnection loop is closed by using the feedback from the outputs of velocity comparator 54 to apply precession correction to the gyroscope 36, said feedback signals comprising the Doppler-inertial velocity differences and their time integrals, together with the inertially derived velocities, the initial data for the velocity and acceleration factors being obtained from said stable platform and Doppler radar 10.

The centripetal acceleration and earth's rate corrections, added at inputs 98, 198 and 86, 186, respectively, are necessary for extended navigational accuracy.

The type of circuitry used in the mixing networks and associated amplifiers is well known in the art and need not be entered into in detail, since the specific arrangement may be varied to suit a particular installation. Similarly, the motor-tachometer type integrators are well known and suitable components are readily available. Alternatively, other forms of integrators such as electronic or thermal types may be used. While the gyroscope pick-offs 28 and 30, torquers 102 and 104 and the accelerometers 32 and 34 are shown detached from the gyroscope 36 for clarity of illustration in the diagrammatic form of FIGURE 1, it will be obvious that the pick-offs and torquers will be incorporated into the gimbal mounting of the gyroscope, the accelerometers being mounted in a suitable location on the inner gimbal, the arrangement being well known in the art.

By interconnecting a Doppler radar system and a stable platform inertial system to utilize the most accurate data from each, a high degree of stability is achieved. In the particular system described herein, a stable platform having a single gyroscope with only two axes of freedom provides acceleration data which can be converted to attitude information to a Doppler radar to provide desirable correction to the Doppler velocity data. The Doppler and inertial velocities are compared and the result treated as an error signal which is used to damp the inertial system and reduce its undamped period of oscillation to a desirable value. The pendulum oscillation characteristics of an inertial system must also be considered in navigation for extended periods, the oscillation period in a Schuler tuned system, for instance, being 84 minutes, which allows the gyro system a period of 21 minutes to build up drift errors before decreasing as is well known. By providing damping through the Doppler-inertial interconnection, the system as a whole is highly stabilized and combines the instantaneous accuracy of the inertial system with the long term reliability of the Doppler radar, the build-up period for gyro drift errors being reduced to a minimum. The level of velocity feedback in the system is accurately controlled to provide an induced precession in the stable platform proportional to the angular motion of the aircraft around the earth. In other words, the angular acceleration of the stable platform is equal to the angular acceleration of the vehicle about the center of the earth, as by Schuler tuning, so maintaining a constantly accurate vertical reference platform.

While primarily intended for use in aircraft, the system may feasibly be installed in missiles or orbital vehicles or, with suitable adaptation of the Doppler system, can be applied to ships or submersible craft.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

We claim:

1. A Doppler-inertial ground velocity indicator for use in a moving vehicle, comprising: a Doppler velocity computer; a stable platform containing a gyroscope pivotally movable about fixed reference axes of vehicle headingly and drift motion; accelerometers operatively mounted on said platform; said accelerometers being oriented to detect accelerations parallel to said reference axes and provide output signals proportional to the heading and drift accelerations; integrators connected to said accelerometers to convert the acceleration signals to velocity signals; said computer having outputs providing directional velocity signals comparable to those from said integrators; a velocity comparator having means to compare the velocity signals from said computer outputs with those from said integrators and to produce output error signals proportional to the differences between the comparable velocity signals; said gyroscope having erecting means coupled to shift the gyroscope about said reference axes; and means to apply the output error signals from said velocity comparator to said erecting means to erect the gyroscope and compensate for accelerations of the vehicle.

2. A Doppler-inertial ground velocity indicator for use in a moving vehicle, comprising: a Doppler velocity computer having outputs providing velocity signals proportional to the heading and drift velocities of the vehicle; a stable platform containing a gyroscope having two fixed orthogonal axes of freedom corresponding to the roll and pitch axes of the vehicle; accelerometers operatively mounted on said platform; said accelerometers being oriented to detect directly the heading and drift accelerations and provide output signals proportional to the accelerations; integrators connected to said accelerometers to convert the acceleration signals to velocity signals proportional to the heading and drift velocities of the vehicle; a velocity comparator interconnecting said integrators and said Doppler velocity computer; said velocity comparator having means to compare the corresponding heading and drift velocity signals from said integrators and said computer and provide output error signals proportional to the differences thereof; said gyroscope having erecting means coupled thereto to shift the gyroscope about said axes of freedom; and means to apply the error signals from said velocity comparator to said erecting means to erect the gyroscope and compensate for accelerations of the vehicle.

3. A Doppler-inertial ground velocity indicator for use in a moving vehicle, comprising: a Doppler velocity computer having outputs providing velocity signals proportional to the heading and drift velocities of the vehicle; a stable platform containing a gyroscope having two fixed orthogonal axes of freedom corresponding to the roll and pitch axes of the vehicle; accelerometers operatively mounted on said platform; said accelerometers being oriented to detect directly the heading and drift accelerations and provide output signals proportional to the accelerations; integrators connected to said accelerometers to convert the acceleration signals to velocity signals proportional to the heading and drift velocities of the vehicle; a velocity comparator interconnecting said integrators and said Doppler velocity computer; said velocity comparator having means to compare the corresponding heading and drift velocity signals from said integrators and said computer and provide output error signals proportional to the differences thereof; the spin axis of said gyroscope being normally vertical; erecting means coupled to said gyroscope to shift the gyroscope about said axes of freedom; and means to apply the error signals from said velocity comparator to said erecting means as correcting signals to maintain the gyroscope spin axis vertical and compensate for accelerations of the vehicle.

4. A Doppler-inertial ground velocity indicator according to claim 3, and wherein said gyroscope has sensing means thereon to detect motion of the gyroscope about said axes of freedom and provide roll and pitch output signals proportional to the displacement of the gyroscope; said output signals being applied to said Doppler velocity computer as correction signals to compensate the Doppler derived velocity signals for roll and pitch of the vehicle.

5. A Doppler-inertial ground velocity indicator for use in a moving vehicle, comprising: a Doppler velocity computer having outputs providing velocity signals proportional to the heading and drift velocities of the vehicle; a stable platform containing a gyroscope having two fixed orthogonal axes of freedom corresponding to the roll and pitch axes of the vehicles; accelerometers operatively mounted on said platform; said accelerometers being oriented to detect directly the heading and drift accelerations and provide output signals proportional to the accelerations; a Doppler-inertial interconnector including an acceleration integrator having acceleration inputs connected to said accelerometers and outputs providing velocity signals proportional to the acceleration input signals; and a velocity comparator having inputs connected to said Doppler velocity computer outputs; said acceleration integrator outputs being connected to said velocity comparator inputs; said velocity comparator having means to compare the corresponding velocity signals from said computer and said acceleration integrator and having final outputs providing error signals proportional to the differences between the compared velocity signals; the spin axis of said gyroscope being normally vertical; erecting means coupled to said gyroscope to shift the gyroscope about said axes of freedom; and means to apply the error signals from said velocity comparator to said erecting means as correcting signals to maintain the gyroscope spin axis vertical and compensate for accelerations of the vehicle.

6. A Doppler-inertial ground velocity indicator for use in a moving vehicle, comprising: a Doppler velocity computer having outputs providing velocity signals proportional to the heading and drift velocities of the vehicle; a stable platform containing a gyroscope having two fixed orthogonal axes of freedom corresponding to the roll and pitch axes of the vehicle; accelerometers operatively mounted on said platform; said accelerometers being oriented to detect directly the heading and drift accelerations and provide output signals proportional to the accelerations; a Doppler-inertial interconnector including an acceleration integrator having acceleration inputs connected to said accelerometers and outputs providing velocity signals proportional to the acceleration input signals; and a velocity comparator having inputs connected to said Doppler velocity computer outputs; said acceleration integrator outputs being connected to said velocity comparator inputs; input mixing networks at said velocity comparator inputs in which the corresponding velocity signals from said computer and said acceleration integrator are compared; said velocity comparator having final outputs providing error signals proportional to the differences between the compared velocity signals; output mixing networks incorporated in said final outputs; said acceleration integrator outputs being connected to said output mixing networks; the spin axis of said gyroscope being normally vertical; erecting means coupled to said gyroscope to shift the gyroscope about said axes of freedom; and means to apply the error signals from said velocity comparator to said erecting means as correcting signals to maintain the gyroscope spin axis vertical and compensate for acceleration of the vehicle.

7. A Doppler-inertial ground velocity indicator according to claim 5, and wherein said acceleration integrator includes a mixing network at each of said inputs, and an integrator connected to each of said mixing network; said integrators each comprising an amplifier connected to the respective mixing network, a motor energized by the output of said amplifier, a tachometer and a potentiometer driven by said motor; the output of said tachometer being fed back to the respective mixing network; the output of said potentiometer being the time integral of the input acceleration signal and providing an inertially derived velocity signal.

8. A Doppler-inertial ground velocity indicator according to claim 6, and wherein said acceleration integrator includes a mixing network at each of said inputs, and an integrator connected to each of said mixing networks; the output of each of said integrators being fed back to its respective mixing network; the outputs of said integrators being the time integrals of the input acceleration signals and providing inertially derived velocity signals; said velocity comparator input mixing networks being connected to said acceleration integrator input mixing networks, whereby the velocity error signals are added to the acceleration input signals.

9. A Doppler-inertial ground velocity indicator according to claim 6 and wherein said acceleration integrator includes a mixing network at each of said inputs, and an integrator connected to each of said mixing networks; the output of each of said tachometers being fed back to its respective mixing network; the outputs of said integrators being the time integrals of the input acceleration signals and providing inertially derived velocity signals; said velocity comparator having integrators between said input and output mixing networks to integrate the error signals with respect to time; said input mixing networks also being connected directly to said output mixing networks, whereby the signal at said velocity comparator final outputs includes the velocity error signals, the time integrals of the error signals and the inertially derived velocity signals.

References Cited in the file of this patent
UNITED STATES PATENTS

| 2,908,902 | Gray | Oct. 13, 1959 |
| 2,914,763 | Greenwood | Nov. 24, 1959 |

OTHER REFERENCES

Aviation Week; vol. 64, No. 4, Jan. 23, 1956, page 76; an article by Philip J. Klass, Hybrid Systems Ease Design Problems.